United States Patent
Kim

(10) Patent No.: US 8,259,181 B2
(45) Date of Patent: Sep. 4, 2012

(54) IMAGE QUALITY ASSESSMENT METHOD AND IMAGE QUALITY ASSESSMENT APPARATUS FOR DISPLAY APPARATUS

(75) Inventor: Tae-hee Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 803 days.

(21) Appl. No.: 12/395,844

(22) Filed: Mar. 2, 2009

(65) Prior Publication Data

US 2009/0322887 A1 Dec. 31, 2009

(30) Foreign Application Priority Data

Jun. 27, 2008 (KR) ........................ 10-2008-0062008

(51) Int. Cl.
*H04N 17/02* (2006.01)
*H04N 17/00* (2006.01)

(52) U.S. Cl. .......................... 348/189; 348/181; 348/191
(58) Field of Classification Search .................. 348/189, 348/190, 180, 191, 181; 345/440.1, 690; 702/66, 67, 69, 71, 72, 75, 81; 445/2, 63
See application file for complete search history.

(56) References Cited

U.S. PATENT DOCUMENTS

| | | | | | |
|---|---|---|---|---|---|
| 4,511,228 | A | * | 4/1985 | von Gierke et al. | 351/243 |
| 4,533,950 | A | * | 8/1985 | Harshbarger | 348/189 |
| 4,853,592 | A | * | 8/1989 | Strathman | 313/495 |
| 5,319,459 | A | * | 6/1994 | Mochizuki et al. | 348/189 |
| 5,343,242 | A | * | 8/1994 | Rowsell et al. | 348/181 |
| 5,510,851 | A | * | 4/1996 | Foley et al. | 348/658 |
| 5,671,011 | A | * | 9/1997 | Kim | 348/189 |
| 6,295,083 | B1 | * | 9/2001 | Kuhn | 348/190 |
| 7,369,159 | B2 | * | 5/2008 | Somers | 348/181 |
| 7,821,534 | B2 | * | 10/2010 | Somers | 348/181 |
| 2003/0161520 | A1 | * | 8/2003 | Yamano et al. | 382/128 |
| 2005/0259153 | A1 | * | 11/2005 | Oka | 348/189 |
| 2007/0126451 | A1 | * | 6/2007 | Chang | 324/765 |

* cited by examiner

*Primary Examiner* — Victor Kostak
(74) *Attorney, Agent, or Firm* — Sughrue Mion, PLLC

(57) ABSTRACT

An image quality assessment method and an image quality assessment apparatus are provided. In the image quality assessment method, the contrast of a measurement pattern displayed on the display apparatus, the brightness of the background, and the resolution are adjusted, and thereby the luminance characteristic of the measurement pattern is detected. Accordingly, the image quality of a display apparatus can be assessed using the number of waves determined from the luminance characteristic and the modulation transfer function (MTF) of the waves. Therefore, image quality assessment can be performed objectively by the display apparatus.

25 Claims, 6 Drawing Sheets

LUMINANCE

PIXEL POSITION OF CCD CAMERA peak to peak

IMAGE QUALITY ASSESSMENT METHOD AND IMAGE QUALITY ASSESSMENT APPARATUS FOR DISPLAY APPARATUS

CROSS-REFERENCE TO RELATED APPLICATIONS

This application claims priority from Korean Patent Application No. 10-2008-0062008, filed on Jun. 27, 2008 in the Korean Intellectual Property Office, the disclosure of which is incorporated herein by reference in its entirety.

BACKGROUND OF THE INVENTION

1. Field of the Invention

Apparatuses and methods consistent with the present invention relate to an image quality assessment method and an image quality assessment apparatus for display apparatuses, and more particularly, to an image quality assessment method for assessing the image quality of a digital television or a monitor, and an image quality assessment apparatus for a display apparatus.

2. Description of the Related Art

Recently, display apparatuses such as cathode ray tubes (CRTs), liquid crystal displays (LCDs), plasma display panels (PDPs), and organic electro luminescence (EL) have become widespread. Accordingly, the necessity for providing information on the superiority of products by assessing their image quality increases. Diverse methods for assessing the image quality of display apparatuses have been proposed, but such methods have generally had a low correlation with visual sensitivity. Therefore, there is demand for an image quality assessment method which ensures visual objectivity. In addition, there is a need for an image quality assessment method for quantitatively representing the degree of detail of a moving object.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An aspect of the present invention is providing an image quality assessment apparatus for a display apparatus which assesses the image quality of the display apparatus using the number of waves on a measurement pattern displayed on the display apparatus and the modulation transfer function (MTF) of the waves, and an image quality assessment method thereof.

According to an exemplary aspect of the present invention, there is provided an image quality assessment method of an image quality assessment apparatus which assesses the image quality of a display apparatus, the method including detecting a number of waves from the luminance characteristic of a measurement pattern displayed on the display apparatus, and assessing the image quality of the display apparatus by determining whether or not the number of waves is identical to a cycle of the measurement pattern.

The number of waves may be obtained by filtering the luminance characteristic of the measurement pattern.

Assessing the image quality of the display apparatus may include varying the luminance characteristic of the measurement pattern, whenever the luminance characteristic of the measurement pattern varies, extracting a highest resolution of the measurement pattern at which the number of waves is identical to the cycle of the measurement pattern, and averaging the extracted highest resolutions and outputting the average as an image quality assessment result.

In varying the luminance characteristic of the measurement pattern, a contrast and a brightness of a background of the measurement pattern may be adjusted.

The method may further include determining a modulation transfer function (MTF) of the waves from the luminance characteristic of the measurement pattern, wherein in assessing the image quality of the display apparatus, the image quality of the display apparatus is assessed using the determination result to determine whether or not the number of waves is identical to the cycle of the measurement pattern, and a result of comparing the MTF of the waves with a preset value.

The MTF of the waves may be obtained by filtering the luminance characteristic of the measurement pattern.

The MTF of the waves may be a peak-to-peak ratio of the waves obtained by filtering the luminance characteristic.

Assessing the image quality of the display apparatus may include varying the luminance characteristic of the measurement pattern, whenever the luminance characteristic of the measurement pattern varies, extracting a highest resolution of the measurement pattern at which the number of waves is identical to the cycle of the measurement pattern and at which the MTF of the waves is higher than the preset value; and averaging the extracted highest resolutions and outputting the average as an image quality assessment result.

The measurement pattern may include one or more cycle vertical lines.

At least one of a number, thickness, and color of vertical lines in the measurement pattern may be variable.

The luminance characteristic of the measurement pattern displayed on the display apparatus may be detected from an image signal which is obtained by photographing an entire screen or a partial screen of the display apparatus.

According to another exemplary aspect of the present invention, there is provided an image quality assessment apparatus including a comparison unit which detect a number of waves from a luminance characteristic of a measurement pattern displayed on a display apparatus, and compares the detected number of waves with a cycle of the measurement pattern, and a mean value calculation unit which outputs an image quality assessment result based on the result of compares the detected number of waves with the cycle of the measurement pattern performed by the comparison unit.

The image quality assessment apparatus may further include a filter unit which filters the luminance characteristic of the measurement pattern.

The comparison unit may extract and output a highest resolution of the measurement pattern at which the number of waves is identical to the cycle of the measurement pattern, and wherein the mean value calculation unit averages the highest resolutions output by the comparison unit whenever the luminance characteristic of the measurement pattern varies, and outputs the average as the image quality assessment result.

The image quality assessment apparatus may further include a luminance characteristic detection unit which detects the luminance characteristic of the measurement pattern varying when a contrast and a brightness of the background of the measurement pattern are adjusted.

The image quality assessment apparatus may further include a modulation transfer function (MTF) detection unit which detects an MTF of waves based on the luminance characteristic of the measurement pattern, wherein the comparison unit compares whether or not the number of waves is identical to the cycle of the measurement pattern, and compares the MTF of the waves with a preset value.

The MTF determination unit may detect the MTF by combining a first waveform obtained by filtering the luminance characteristic of the measurement pattern using a band pass filter (BPF), and a second waveform obtained by filtering the luminance characteristic of the measurement pattern using a low pass filter (LPF)

The MTF determination unit may detect as the MTF a peak-to-peak ratio of a third waveform obtained by combining an upper envelope of the first waveform with the second waveform to a fourth waveform obtained by combining a lower envelope of the first waveform with the second waveform.

The comparison unit may extract a highest resolution of the measurement pattern at which the number of waves is identical to the cycle of the measurement pattern and at which the MTF of the waves is higher than the preset value, and the mean value calculation unit may average the highest resolutions output by the comparison unit whenever the luminance characteristic of the measurement pattern varies, and output the average as the image quality assessment result.

The measurement pattern may include one or more cycle vertical lines, and at least one of a number, thickness, and color of vertical lines in the measurement pattern may be variable.

The luminance characteristic detection unit may detect the luminance characteristic of the measurement pattern from an image signal which is transmitted from a photographing apparatus which captures an entire screen or a partial screen of the display apparatus.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
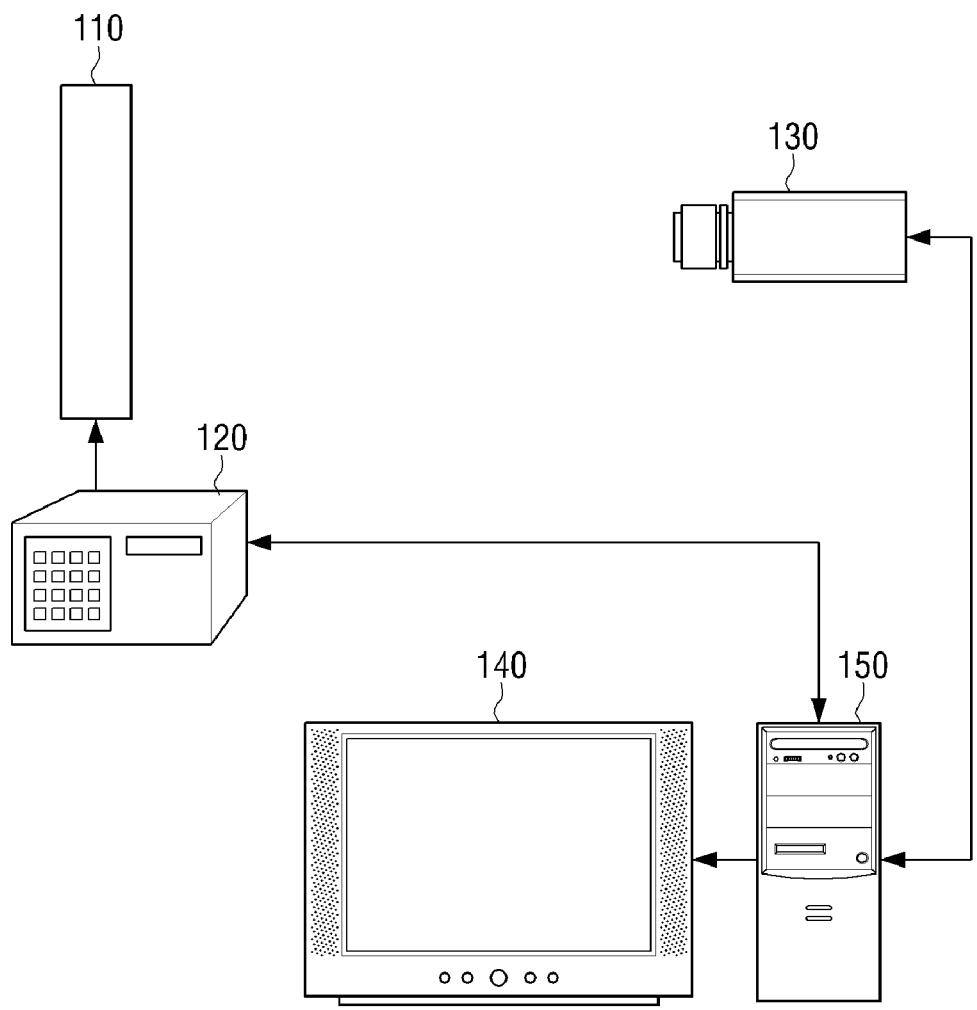
FIG. 1 is a schematic perspective view of an image quality assessment system using an image quality assessment method according to an exemplary embodiment of the present invention.

Certain exemplary embodiments of the present invention will now be described in greater detail with reference to the accompanying drawings.

In the following description, like reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

FIG. 1 is a schematic perspective view of an image quality assessment system using an image quality assessment method according to an exemplary embodiment of the present invention.

Referring to FIG. 1, a measurement pattern generated by a pattern generation apparatus 120 is transmitted to a display apparatus 110 and displayed on the display apparatus 110. The measurement pattern displayed on the display apparatus 110 is captured by a photographing apparatus 130. An image signal of the captured measurement pattern is transmitted to an image quality assessment apparatus 150. The image quality assessment apparatus 150 detects the luminance characteristic of the measurement pattern by analyzing its image signal, and determines the number of waves of the measurement pattern and the modulation transfer function (MTF), which is a wave modulation ratio, based on the luminance characteristic so as to assess the image quality of the display apparatus 110. A monitor 140 displays graphs or numerical values so that a user can identify the image quality assessment process. The photographing apparatus 130 may capture the entire screen of the display apparatus 110 or a partial screen of the display apparatus 110, for example, 100 horizontal pixels.

Figure 2:
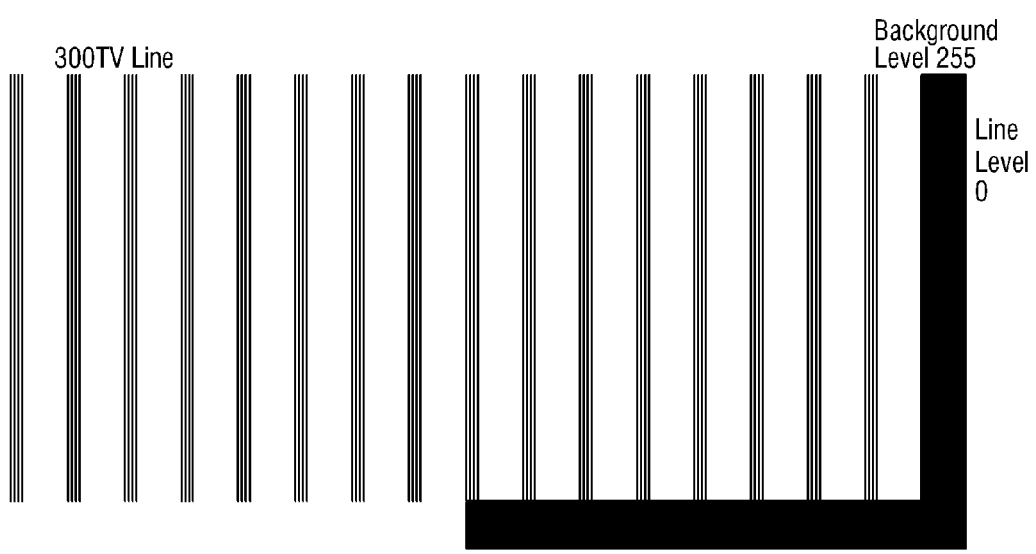
FIG. 2 illustrates an example of a measurement pattern which is used in an image quality assessment method according to an exemplary embodiment of the present invention.

FIG. 2 illustrates an example of a measurement pattern which is used in an image quality assessment method according to an exemplary embodiment of the present invention.

The measurement pattern of FIG. 2 includes 300 TV lines which are generated by the pattern generation apparatus 120. The lines have a gray level of 0, and the background has a gray level of 255. The measurement pattern of FIG. 2 consists of four-cycle vertical lines, but may consist of one or more cycle vertical lines. In addition, the pattern generation apparatus 120 may generate measurement patterns having different TV lines such as 350, 400, 450, 500, . . . , 1000, and 1050 TV lines, and transmit them to the display apparatus 110. As the number of TV lines increases, the density of the vertical lines becomes greater, so the measurement pattern is expressed more densely. The higher the number of TV lines, the higher the resolution of the measurement pattern.

If such diverse measurement patterns are displayed on the display apparatus 110, the photographing apparatus 130 captures them. Subsequently, the image assessment apparatus 150 measures the luminance characteristic of the measurement pattern from an image signal of the captured measurement patterns, and determines the number of waves and the MTF based on the luminance characteristic, so that the number of waves and the MTF can be used to assess the image quality of the display apparatus 110. The operation of the image quality assessment apparatus 150 is described in greater detail with reference to FIGS. 3 to 4D.

Figure 3:
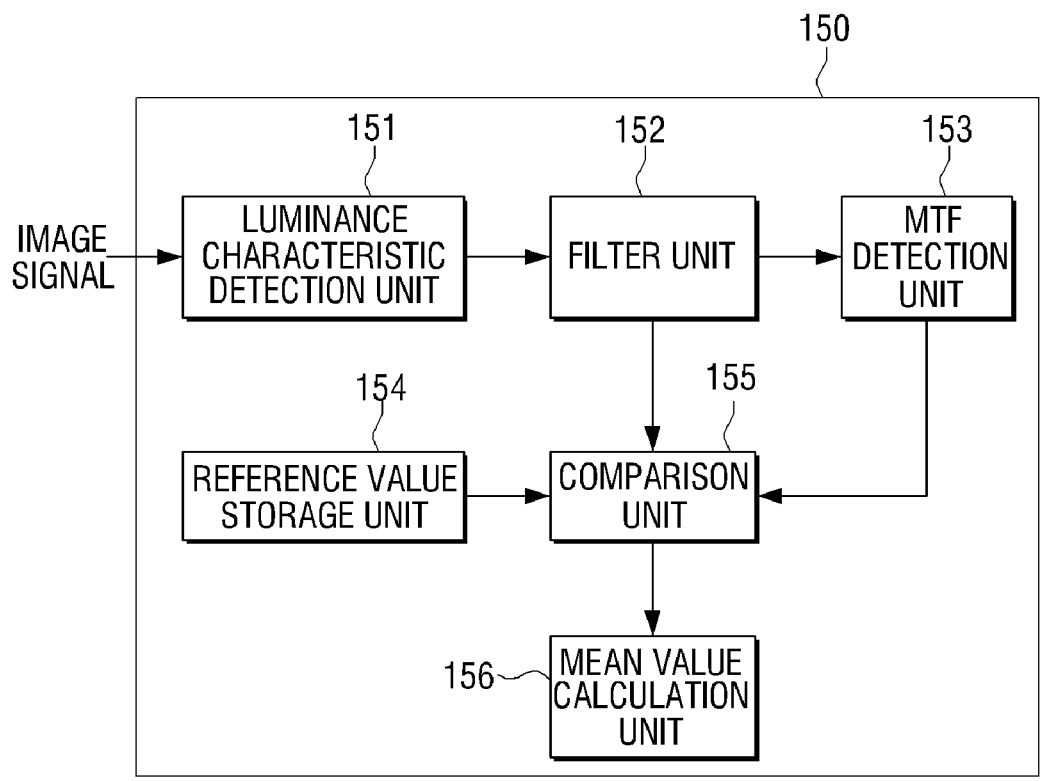
FIG. 3 is a schematic block diagram of an image quality assessment apparatus according to an exemplary embodiment of the present invention.
Figure 4A:
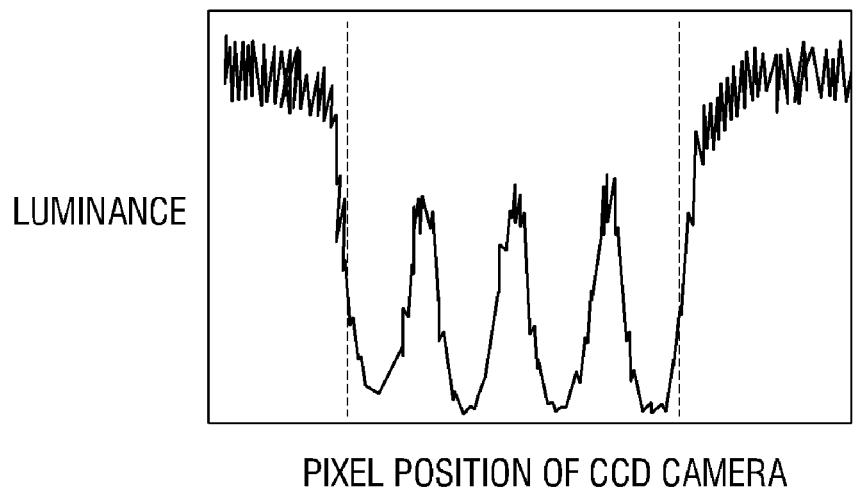
FIGS. 4A to 4D are graphs illustrating a method for determining the number of waves and the MTF based on the luminance characteristic of a measurement pattern used in an image assessment apparatus according to an exemplary embodiment of the present invention.
Figure 4B:
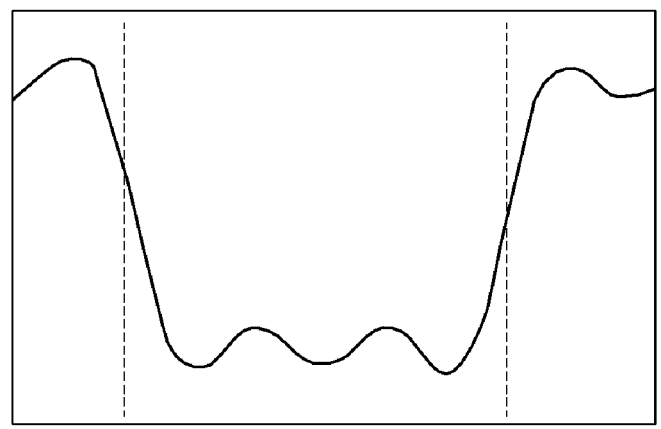
Figure 4C:
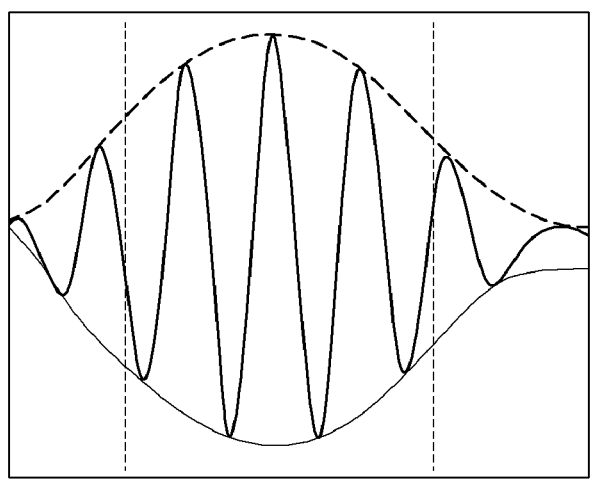
Figure 4D:
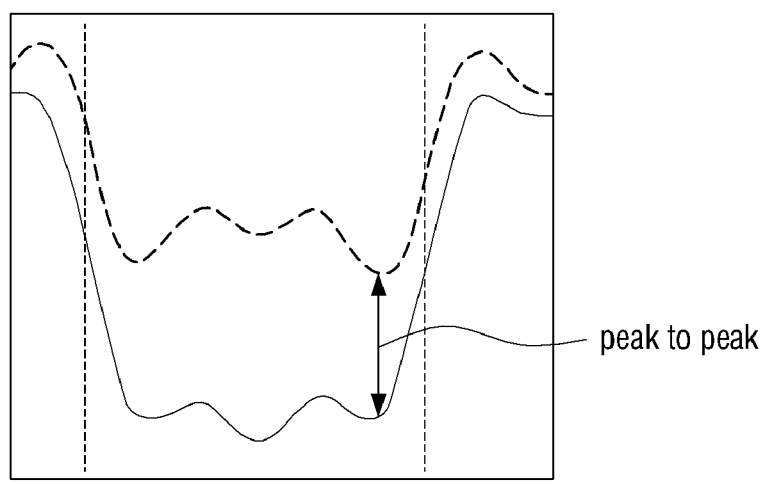

FIG. 3 is a schematic block diagram of an image quality assessment apparatus according to an exemplary embodiment of the present invention. FIGS. 4A to 4D are graphs illustrating a method for determining the number of waves and the MTF based on the luminance characteristic of a measurement pattern in an image assessment apparatus according to an exemplary embodiment of the present invention.

Referring to FIG. 3, the image quality assessment apparatus 150 includes a luminance characteristic detection unit 151, a filter unit 152, an MTF detection unit 153, a reference value storage unit 154, a comparison unit 155, and a mean value calculation unit 156.

If an image signal captured by the photographing apparatus 130 is transmitted to the image quality assessment apparatus 150, the luminance characteristic detection unit 151 detects the luminance characteristic of a measurement pattern from the image signal. The luminance characteristic detected by the luminance characteristic detection unit 151 may be represented as a waveform as illustrated in FIG. 4A. In FIG. 4A, the horizontal axis represents the pixel position of a charge-coupled device (CCD) (not shown) in the photographing apparatus 130, and the vertical axis represents the luminance.

The filter unit 152 filters and outputs the detected luminance characteristic using a low pass filter (LPF) and a band pass filter (BPF). FIG. 4B shows the result of filtering the luminance characteristic using the LPF, and FIG. 4C shows the result of filtering the luminance characteristic using the BPF. If the luminance characteristic is filtered using the BPF, the number of waves of the measurement pattern can be known. FIG. 4C shows that the number of waves of the measurement pattern is four.

The MTF determination unit 153 determines the MTF of the measurement pattern using the filtering results of the filter unit 152. That is, the MTF determination unit 153 generates an upper waveform of FIG. 4D by combining the waveform in FIG. 4B and the upper envelope of the waveform in FIG. 4C, and generates a lower waveform of FIG. 4D by combining the waveform in FIG. 4B and the lower envelope of the waveform in FIG. 4C. The peak-to-peak ratio of the upper waveform to the lower waveform is output as the MTF of the measurement pattern.

The reference value storage unit 154 stores the cycle of the measurement pattern generated by the pattern generation unit 120, and a preset MTF reference value. The MTF reference value is set and stored as a numerical value closest to that visible to the human eye.

The comparison unit 155 compares the number of waves detected from the filtering result using the BPF of the filter unit 152 with the cycle of the measurement pattern stored in the reference value storage unit 154. Furthermore, the comparison unit 155 compares whether or not the MTF determined by the MTF determination unit 153 is higher than the preset MTF reference value. That is, it is determined whether or not the number of waves and the MTF for each resolution satisfy a preset condition by adjusting the resolution level of the measurement pattern displayed on the display apparatus 110 using the pattern generation unit 120. The detailed operation of the comparison unit 155 is described with reference to Table 1 below.

resents the MTF of a measurement pattern. The brightness of the background and the contrast are adjusted by the pattern generation unit 120. Measurement patterns in which the brightness of the background and the contrast are adjusted in stages are transmitted to the display apparatus 110. The photographing apparatus 130 captures a measurement pattern displayed on the display apparatus, and transmits an image signal to the luminance characteristic detection unit 151 so that the luminance characteristic detection unit 151 can detect the luminance characteristic of the measurement pattern in which the brightness of the background and the contrast are adjusted. In other words, the luminance characteristic of the measurement pattern may be changed according to adjustment of the brightness of the background and the contrast.

As illustrated in Table 1, when the background of a measurement pattern is bright and the contrast is high, the comparison unit 155 determines whether or not the number of waves is the same as 4, which is the cycle of the measurement pattern, and determines whether or not the MTF is higher than 0.03, which is a preset value. In the same manner, when the background of a measurement pattern is bright and the contrast is medium, the comparison unit 155 determines whether or not the number of waves is the same as 4, which is the cycle of the measurement pattern, and determines whether or not the MTF is higher than 0.03, which is a preset value. When the background of a measurement pattern is bright and the contrast is low, the comparison unit 155 compares the number of waves and the MTF with preset values in the same manner.

As described above, the number of waves and the MTF in each case are compared with preset values by adjusting the brightness of a measurement pattern to bright, medium, or dark, and adjusting the contrast to high, medium, or low. As a result, when the background is bright and the contrast is high, if the resolution of the measurement pattern is 650, the number of waves is not 4. That is, when the background is bright and the contrast is high, the highest resolution satisfying the preset conditions is 600. In different cases, if the highest resolutions are selected in the same manner, the results obtained are as illustrated in Table 2.

TABLE 2

|  |  | Brightness of the background | | |
|---|---|---|---|---|
|  |  | Bright | Medium | Dark |
| Contrast | High | 600 | 600 | 650 |
|  | Medium | 850 | 800 | 900 |
|  | Low | 950 | 900 | 900 |

The mean value calculation unit 156 averages the highest resolution levels which are selected whenever the luminance characteristic of the measurement pattern changes, and

TABLE 1

| BB | C | 300 | ... | 600 | 650 | ... | 800 | 850 | 900 | 950 | 1000 | 1080 |
|---|---|---|---|---|---|---|---|---|---|---|---|---|
| B | H | 0.443[4] | ... | 0.104[4] | 0.085[3] | ... | 0.025[3] | 0.019[2] | 0.027[2] | 0.032[2] | 0.026[1] | 0.025[1] |
| B | M | 0.485[4] | ... | 0.207[4] | 0.171[4] | ... | 0.084[4] | 0.057[4] | 0.045[3] | 0.022[2] | 0.030[3] | 0.016[2] |
| B | L | 0.334[4] | ... | 0.204[4] | 0.084[4] | ... | 0.123[4] | 0.079[4] | 0.062[4] | 0.033[4] | 0.023[3] | 0.036[3] |
| M | H | 0.436[4] | ... | 0.185[4] | 0.089[3] | ... | 0.039[2] | 0.056[4] | 0.032[2] | 0.038[1] | 0.032[1] | 0.047[1] |
| M | M | 0.537[4] | ... | 0.246[4] | 0.176[4] | ... | 0.087[4] | 0.067[3] | 0.058[3] | 0.034[3] | 0.022[2] | 0.036[2] |
| M | L | 0.478[4] | ... | 0.224[4] | 0.195[4] | ... | 0.113[4] | 0.070[4] | 0.050[4] | 0.039[3] | 0.016[3] | 0.015[3] |
| D | H | 0.514[4] | ... | 0.237[4] | 0.104[4] | ... | 0.033[4] | 0.045[3] | 0.050[2] | 0.047[2] | 0.030[1] | 0.066[1] |
| D | M | 0.562[4] | ... | 0.208[4] | 0.167[4] | ... | 0.100[4] | 0.078[4] | 0.066[4] | 0.030[3] | 0.025[2] | 0.030[3] |
| D | L | 0.480[4] | ... | 0.108[4] | 0.161[4] | ... | 0.079[4] | 0.068[4] | 0.053[4] | 0.028[4] | 0.011[3] | 0.026[3] |

BB: Brightness of the Background (B: Bright; M: Medium; D: Dark)
C: Contrast (H: High; M: Medium; L: Low)

In Table 1, the number shown between square brackets [ ] represents the number of waves, and the decimal values repthereby outputs the average as an image quality assessment result. In Table 2, the image quality assessment result is 794.

In the above exemplary embodiment, both the number of waves and the MTF are used for the image quality assessment, but it is possible to assess the image quality using merely the number of waves. In the case of using the number of waves only, the highest resolutions based on Table 1 may be obtained as illustrated in Table 3, and the image quality assessment result is 800.

TABLE 3

|          |        | Brightness of the background |        |      |
|----------|--------|------------------------------|--------|------|
|          |        | Bright                       | Medium | Dark |
| Contrast | High   | 600                          | 600    | 650  |
|          | Medium | 850                          | 800    | 900  |
|          | Low    | 950                          | 900    | 950  |

Using such an image quality assessment method, the image quality of the display apparatus 110 can be assessed.

Figure 5:
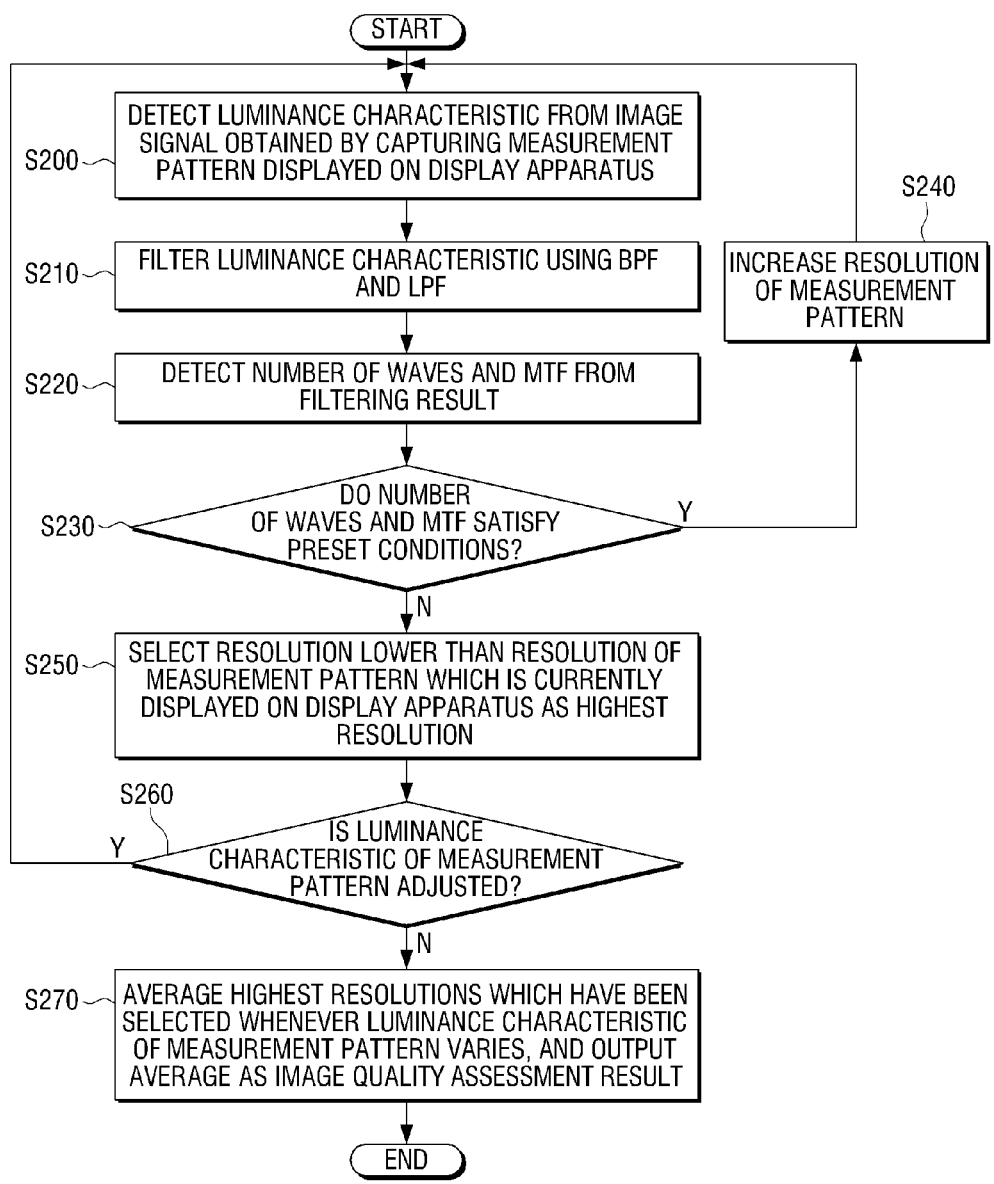
FIG. 5 is a flow chart illustrating an image quality assessment method according to an exemplary embodiment of the present invention.

FIG. 5 is a flow chart illustrating an image quality assessment method according to an exemplary embodiment of the present invention.

Referring to FIG. 5, the image quality assessment apparatus 150 detects the luminance characteristic from an image signal obtained by capturing a measurement pattern displayed on the display apparatus 110 (S200). The luminance characteristic is filtered using the BPF and the LPF (S210), and the number of waves and the MTF are detected from the filtering results (S220). That is, the number of waves is detected from a waveform obtained by filtering the luminance characteristic using the BPF, and the MTF is detected from a waveform in which a waveform obtained by filtering the luminance characteristic using the BPF and a waveform obtained by filtering the luminance characteristic using the LPF are combined.

Whether or not the number of waves and the MTF satisfy preset conditions is determined (S230). If the number of waves and the MTF satisfy the preset conditions (S230-Y), the resolution of the measurement pattern is increased (S240) and operations S200 to S220 are repeated. In this image quality assessment method, it is determined whether or not the number of waves and the MTF satisfy preset conditions by increasingly raising the resolution level of the measurement pattern.

In operation S230, if the number of waves and the MTF do not satisfy the preset conditions (S230-N), the image quality assessment apparatus 150 selects a resolution lower than the resolution of the measurement pattern which is currently displayed on the display apparatus 110 as the highest resolution (S250). With reference to Table 1, if the resolution of the measurement pattern which is currently displayed on the display apparatus 110 is 650, and if the number of waves and the MTF do not satisfy the preset conditions, 600, which is lower than 650, is selected as the highest resolution.

If the luminance characteristic of the measurement pattern changes (S260-Y), operations S200 to S250 are repeated. If the luminance characteristic of the measurement pattern ceases to change (S260-N), the image quality assessment apparatus 150 averages the highest resolutions which have been selected whenever the luminance characteristic of the measurement pattern varies, and outputs the average as the image quality assessment result (S270).

By this process, the image quality of the display apparatus 110 can be easily assessed.

As can be appreciated from the above description, the luminance characteristic and the resolution of the measurement pattern displayed on the display apparatus are adjusted, and thereby the number of waves of the measurement pattern and the MTF are determined case by case and are compared with preset values. Therefore, the image quality of the display apparatus can be easily assessed and the image quality assessment can be performed objectively.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image quality assessment method of an image quality assessment apparatus which assesses the image quality of a display apparatus, the method comprising:
    detecting a number of waves from a luminance characteristic of a measurement pattern displayed on the display apparatus; and
    assessing the image quality of the display apparatus by determining whether or not the number of waves is identical to a cycle of the measurement pattern,
    wherein the assessing comprises assessing the image quality of the display apparatus based on a plurality of highest resolutions of the measurement pattern at which each of a plurality of numbers of waves is identical to the cycle of the measurement pattern.

2. The method according to claim 1, wherein the number of waves is obtained by filtering the luminance characteristic of the measurement pattern.

3. The method according to claim 1, wherein assessing the image quality of the display apparatus comprises:
    varying the luminance characteristic of the measurement pattern, to one of a plurality of luminance characteristics;
    extracting for the plurality of luminance characteristics, the plurality of highest resolutions of the measurement pattern at which each of the plurality of numbers of waves is identical to the cycle of the measurement pattern; and
    averaging the extracted plurality of highest resolutions and outputting the average as an image quality assessment result.

4. The method according to claim 3, wherein in varying the luminance characteristic of the measurement pattern, a contrast and a brightness of a background of the measurement pattern are adjusted.

5. The method according to claim 1, further comprising:
    determining a modulation transfer function (MTF) of the waves from the luminance characteristic of the measurement pattern,
    wherein in assessing the image quality of the display apparatus, the MTF of the waves is compared with a preset value.

6. The method according to claim 5, wherein the MTF of the waves is obtained by filtering the luminance characteristic of the measurement pattern.

7. The method according to claim 6, wherein the MTF of the waves is a peak-to-peak ratio of the waves obtained by filtering the luminance characteristic.

8. The method according to claim 5, wherein assessing the image quality of the display apparatus comprises:
    varying the luminance characteristic of the measurement pattern, to one of a plurality of luminance characteristics;
    extracting for the plurality of luminance characteristics, a plurality of highest resolutions of the measurement pattern at which each of a plurality of numbers of waves is identical to the cycle of the measurement pattern and at which each of a plurality of MTFs of the waves is higher than the present value; and averaging the extracted plurality of highest resolutions and outputting the average as an image quality assessment result.

9. The method according to claim 1, wherein the measurement pattern comprises one or more cycles of vertical lines.

10. The method according to claim 1, wherein at least one of a number, thickness, and color of vertical lines in the measurement pattern is variable.

11. The method according to claim 1, wherein the luminance characteristic of the measurement pattern displayed on the display apparatus is detected from an image signal which is obtained by photographing an entire screen or a partial screen of the display apparatus.

12. An image quality assessment apparatus comprising:
a comparison unit which detects a number of waves from a luminance characteristic of a measurement pattern displayed on a display apparatus, and compares the detected number of waves with a cycle of the measurement pattern; and
a mean value calculation unit which outputs an image quality assessment result based on a result of the comparison of the detected number of waves with the cycle of the measurement pattern performed by the comparison unit,
wherein the comparison unit extracts and outputs a plurality of highest resolutions of the measurement pattern at which the number of waves is identical to the cycle of the measurement pattern, for a plurality of luminance characteristics.

13. The image quality assessment apparatus according to claim 12, further comprising a filter unit which filters the luminance characteristic of the measurement pattern.

14. The image quality assessment apparatus according to claim 12,
wherein the mean value calculation unit averages the plurality of highest resolutions output by the comparison unit, and outputs the average as the image quality assessment result.

15. The image quality assessment apparatus according to claim 14, further comprising a luminance characteristic detection unit which detects the plurality of luminance characteristics of the measurement pattern, the plurality of luminance characteristics set by adjusting a contrast and a brightness of the background of the measurement pattern.

16. The image quality assessment apparatus according to claim 12, further comprising a modulation transfer function (MTF) detection unit which detects an MTF of waves based on the luminance characteristic of the measurement pattern,
wherein the comparison unit compares whether or not the number of waves is identical to the cycle of the measurement pattern, and compares the MTF of the waves with a preset value.

17. The image quality assessment apparatus according to claim 16, wherein the MTF determination unit detects the MTF by combining a first waveform obtained by filtering the luminance characteristic of the measurement pattern using a band pass filter (BPF), and a second waveform obtained by filtering the luminance characteristic of the measurement pattern using a low pass filter (LPF).

18. The image quality assessment apparatus according to claim 17, wherein the MTF determination unit detects as the MTF a peak-to-peak ratio of a third waveform obtained by combining an upper envelope of the first waveform with the second waveform to a fourth waveform obtained by combining a lower envelope of the first waveform with the second waveform.

19. The image quality assessment apparatus according to claim 16, wherein the comparison unit extracts and outputs a plurality of highest resolutions of the measurement pattern at which each of a plurality of numbers of waves is identical to the cycle of the measurement pattern and at which the MTF of the waves is higher than the preset value, for a plurality of luminance characteristics, and
wherein the mean value calculation unit averages the plurality of highest resolutions output by the comparison unit, and outputs the average as the image quality assessment result.

20. The image quality assessment apparatus according to claim 12, wherein the measurement pattern comprises one or more cycles of vertical lines.

21. The image quality assessment apparatus according to claim 12, wherein at least one of a number, thickness, and color of vertical lines in the measurement pattern is variable.

22. The image quality assessment apparatus according to claim 12, wherein the luminance characteristic detection unit detects the luminance characteristic of the measurement pattern from an image signal which is transmitted from a photographing apparatus which captures an entire screen or a partial screen of the display apparatus.

23. A method for determining an image quality of a display, the method comprising:
evaluating a measurement pattern and to a detected pattern, the evaluating comprising:
displaying a measurement pattern on the display, the measurement pattern comprising a number of measurement lines and the displaying being at a contrast level, a brightness level and a resolution level;
capturing the displayed measurement pattern to generate a captured pattern;
determining a number of detected lines in the captured pattern; and
comparing the number of detected lines with the number of measurement lines to generate a first result;
repeating the evaluating at least one of another contrast level, another brightness level, and another resolution level; and
generating an image quality assessment based on a plurality of first results.

24. The method of claim 23, wherein the evaluating further comprises determining a modulation transfer function (MTF) of the captured pattern and comparing the MTF with a preset value to generate a second result.

25. The method of claim 24, wherein the plurality of first results and a plurality of second results are used to determine a plurality of highest resolutions and wherein the image quality assessment comprises an average of the plurality of highest resolutions.

* * * * *